W. GREEN.
STOOL FOR HOLDING TRAPS.
APPLICATION FILED JULY 31, 1913.
1,083,086.
Patented Dec. 30, 1913.
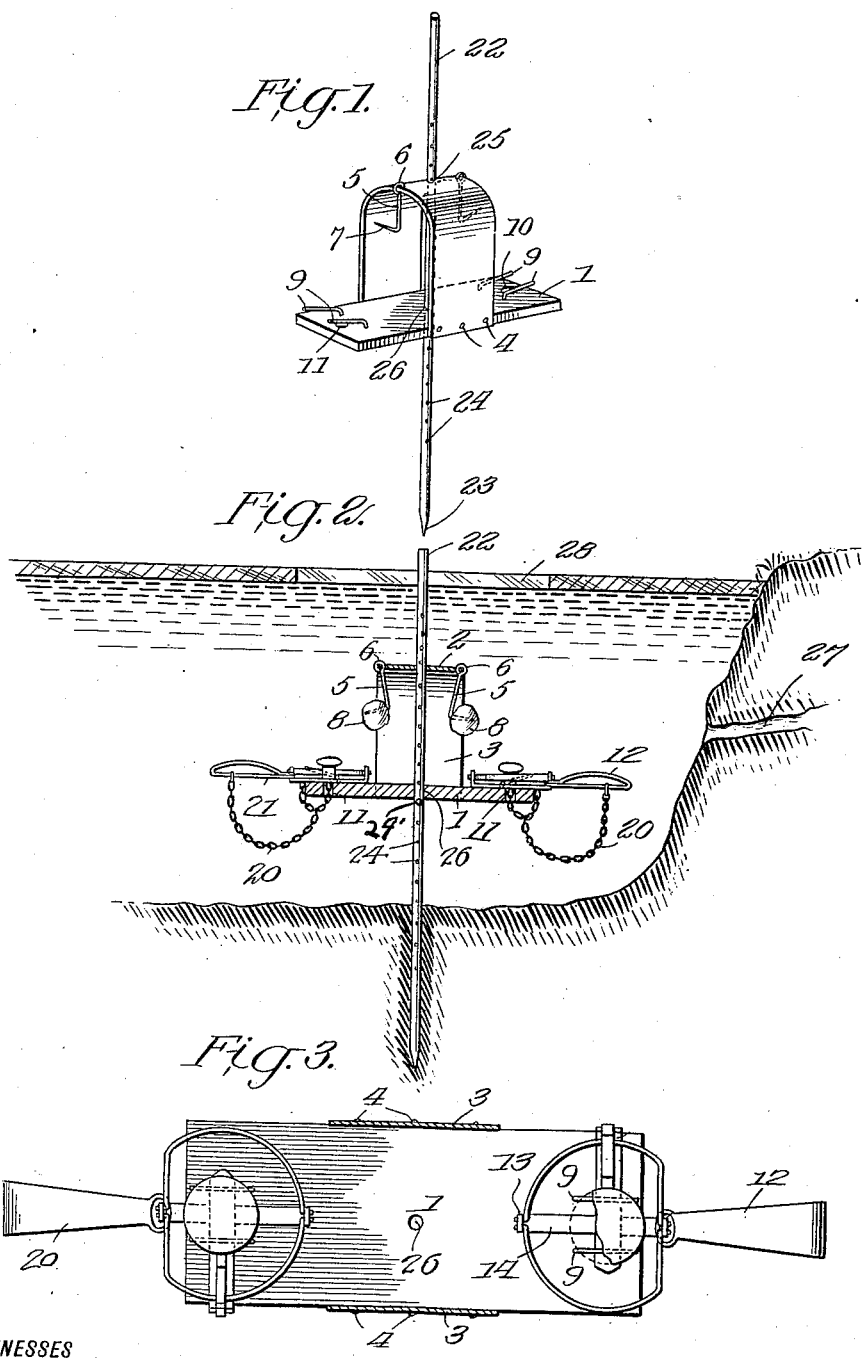
WITNESSES
INVENTOR
William Green
BY
ATTORNEYS

UNITED STATES PATENT OFFICE.

WILLIAM GREEN, OF HOLLY, MICHIGAN.

STOOL FOR HOLDING TRAPS.

1,083,086.  Specification of Letters Patent.  Patented Dec. 30, 1913.

Application filed July 31, 1913. Serial No. 782,231.

*To all whom it may concern:*

Be it known that I, WILLIAM GREEN, a citizen of the United States, and a resident of Holly, in the county of Oakland and State of Michigan, have made certain new and useful Improvements in Stools for Holding Traps, of which the following is a specification.

My invention is an improvement in stools for holding traps, especially for supporting the traps beneath the surface of the water, in position for catching muskrats and the like, and having mechanism for supporting bait in proximity to ordinary steel traps, and so arranged that the animal cannot obtain access to the bait, except by passing over the trap.

In the drawings: Figure 1 is a perspective view of the improved stool, Fig. 2 is a longitudinal vertical section of the stool, with the traps in set position, and Fig. 3 is a plan view of the support for the steel traps, the hood being in section.

The present embodiment of the invention comprises a base plate 1, of wood or the like, and of rectangular form, and connected with the center of the base is a hood, the said hood consisting of a body 2 and sides 3. The hood is arranged with the body thereof transverse to the base, at the center of the base, and the arms or sides 3 are secured at their lower edges to the side edges of the base, by means of nails or screws 4. The body 2 of the hood is provided at each end thereof with a depending bait hook, each of the said hooks comprising a shank 5 having an eye 6 for engaging an opening at the adjacent end of the body of the hood, and a laterally extending sharpened bill or hook 7, for transfixing the bait 8, to support the same. The bill 7 is arranged at slightly less than a right angle with respect to the shank, the arrangement being such that when the bait 8 is in place on the bill, the shank will incline inwardly toward its lower end, so that the greater portion of the bait is hidden by the hood. A plurality of clips is connected with each end of the base, each of the said clips comprising a body 9 extending approximately parallel with the base, and a lateral lug 10 which is engaged with an opening in the base. The base is also provided with an opening 11 between each pair of clips, and each pair of clips is designed to hold a steel trap 12 of ordinary construction, on the base. Any desired form of trap may be used, and the chain 2 of the trap is connected with the opening 11 of the base, as shown in Fig. 2. The trap is arranged on the upper face of the base, with the clips 9 extending transversely of the cross plate or base of the trap.

A standard 22 is made use of for supporting the trap in water, the said standard having its lower end pointed, as indicated at 23, for engaging the ground, and having a longitudinally extending series of openings 24. The body of the hood and the base are provided with registering openings 25 and 26 respectively, for engagement by the standard, and nails or pins 24' may be passed through the openings below the base, or below the hood, to hold the trap in adjusted position.

The stool is set in the water, as shown in Fig. 2, near the entrance to the burrow 27, and with the base at a slightly lower level than the mouth of the burrow. The base is arranged with its long axis approximately parallel with the long axis of the burrow, and is supported in this position by means of the stake or standard in engagement with the ground.

When the muskrat or other animal scents the bait, he naturally will try to obtain the same, and will pass over the adjacent trap to reach the bait. As he steps upon the bait pan, the trap will be sprung.

The improved stool is especially designed for use under ice, as shown in Fig. 2, and an opening 28 is cut in the ice, through which the trap may be inserted. The hood 23 is preferably of sheet iron or the like, and the base or bed piece 1 may be adjusted to the desired height above the bottom. The traps are held in place by the clips and by the chain, and even should the animal pull the trap from beneath the clips, the chain will prevent loss of the trap.

I claim:—

1. In a device of the character specified, the combination with the traps, of a support therefor, said support comprising a base or bed piece of rectangular form, a hood comprising a body and sides or arms, the body being arranged transversely of the base at the center thereof and the lower ends of the arms or sides being secured to the side edges of the base, a bait hook depending from each end of the body of the hood, the base having an opening at each end for engagement by a chain to connect a trap to the base, a pair of clips at each end of the base, the members of the pair being arranged on opposite sides of the opening and being adapted to engage over the body of the trap to hold the trap to the base, the base and the body of the hood having alined openings, and a supporting stake or standard passing through the openings and having its lower end pointed, and having a longitudinally extending series of openings, and a pin for engaging one of the openings below the base to hold the base in adjusted position.

2. In a device of the character specified, the combination with the traps, of a support therefor, said support comprising a base or bed piece of rectangular form, a hood comprising a body and sides or arms, the body being arranged transversely of the base at the center thereof and the lower ends of the arms or sides being secured to the side edges of the base, a bait hook depending from each end of the body of the hood, the base having an opening at each end for engagement by a chain to connect a trap to the base, a pair of clips at each end of the base, the members of the pair being arranged on opposite sides of the opening and being adapted to engage over the body of the trap to hold the trap to the base, and a support for the base, the base being adjustable thereon.

3. In a device of the character specified, the combination with the traps, of a support therefor, said support comprising a base or bed piece, a hood comprising a body and sides or arms, the body being arranged transversely of the base intermediate the ends thereof and the lower ends of the arms or sides being secured to the side edges of the base, a bait hook depending from each end of the body of the hood, the base having an opening at each end for engagement by a chain to connect a trap to the base, and a pair of clips at each end of the base, the members of the pair being arranged on opposite sides of the opening and being adapted to engage over the body of the trap to hold the trap to the base.

4. A device of the character specified, comprising a base provided at each end with means for supporting a trap, a hood in connection with the base, said hood comprising a body arranged transversely of the base at approximately the center thereof, and sides connected with the base at their lower ends, means at each end of the body of the base for supporting bait, said hood and base having alined openings, and a stake or support passing through the openings for supporting the stool, said stool being adjustable vertically on the stake or standard.

WILLIAM GREEN.

Witnesses:
BERENICE HANNAN,
M. GRACE MERRICK.

Copies of this patent may be obtained for five cents each, by addressing the "Commissioner of Patents, Washington, D. C."